(12) United States Patent  (10) Patent No.: US 8,977,667 B2
Nishikawa  (45) Date of Patent: Mar. 10, 2015

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: ICOM Incorporated, Osaka (JP)

( * ) Notice: Subject to any disclaimer, the term of this patent is extended or adjusted under 35 U.S.C. 154(b) by 282 days.

(21) Appl. No.: 13/736,401

(22) Filed: Jan. 8, 2013

(65) Prior Publication Data

US 2013/0254251 A1   Sep. 26, 2013

(30) Foreign Application Priority Data

Mar. 23, 2012   (JP) ................................. 2012-067068

(51) Int. Cl.
  *G06F 17/14*   (2006.01)
  *H04L 27/26*   (2006.01)
(52) U.S. Cl.
  CPC ............ *G06F 17/14* (2013.01); *H04L 27/2615* (2013.01); *H04L 27/2624* (2013.01)
  USPC .......................................... 708/404; 375/239
(58) Field of Classification Search
  None
  See application file for complete search history.

(56) References Cited

U.S. PATENT DOCUMENTS

| | | | | |
|---|---|---|---|---|
| 5,657,313 | A | * | 8/1997 | Takahashi et al. ............. 370/491 |
| 5,892,879 | A | * | 4/1999 | Oshima ......................... 386/353 |
| 6,091,702 | A | * | 7/2000 | Saiki ............................. 370/203 |
| 6,724,976 | B2 | * | 4/2004 | Oshima ......................... 375/261 |

FOREIGN PATENT DOCUMENTS

JP       2006-165781       6/2006

* cited by examiner

*Primary Examiner* — Michael D Yaary
(74) *Attorney, Agent, or Firm* — Warner Norcross & Judd LLP

(57) ABSTRACT

A series generator divides a data series having an autocorrelation property equally into a certain number to generate subdata series. A modulator multiplies a predetermined amplitude coefficient and a unique number by each element of the subdata series, respectively, and rearranges the subdata series and synthesizes the rearranged subdata series to generate the modulation data. An IFFT unit performs an IFFT on the modulation data. The calculator divides the calculation result equally into the certain number to generate the sub calculation results, and multiplies an equalization coefficient by each element of the sub calculation results. A synthesizer generates a baseband signal by arranging the sub calculation results, so that an arranged position corresponds to a position at the time of being divided equally, and synthesizing the arranged result. A transmitter generates the transmission signal and transmits it to another apparatus via an antenna.

10 Claims, 13 Drawing Sheets

FIG. 3

| INPUT SIGNAL | REARRANGEMENT RULE | BEFORE REARRANGEMENT | AFTER REARRANGEMENT |
|---|---|---|---|
| 0000 | P1 | 1234 | 1234 |
| 0001 | P2 | 1234 | 1243 |
| 0010 | P3 | 1234 | 1324 |
| 0011 | P4 | 1234 | 1342 |
| 0100 | P5 | 1234 | 1423 |
| 0101 | P6 | 1234 | 1432 |
| 0110 | P7 | 1234 | 2134 |
| 0111 | P8 | 1234 | 2143 |
| 1000 | P9 | 1234 | 2314 |
| 1001 | P10 | 1234 | 2341 |
| 1010 | P11 | 1234 | 2413 |
| 1011 | P12 | 1234 | 2431 |
| 1100 | P13 | 1234 | 3124 |
| 1101 | P14 | 1234 | 3142 |
| 1110 | P15 | 1234 | 3214 |
| 1111 | P16 | 1234 | 3241 |

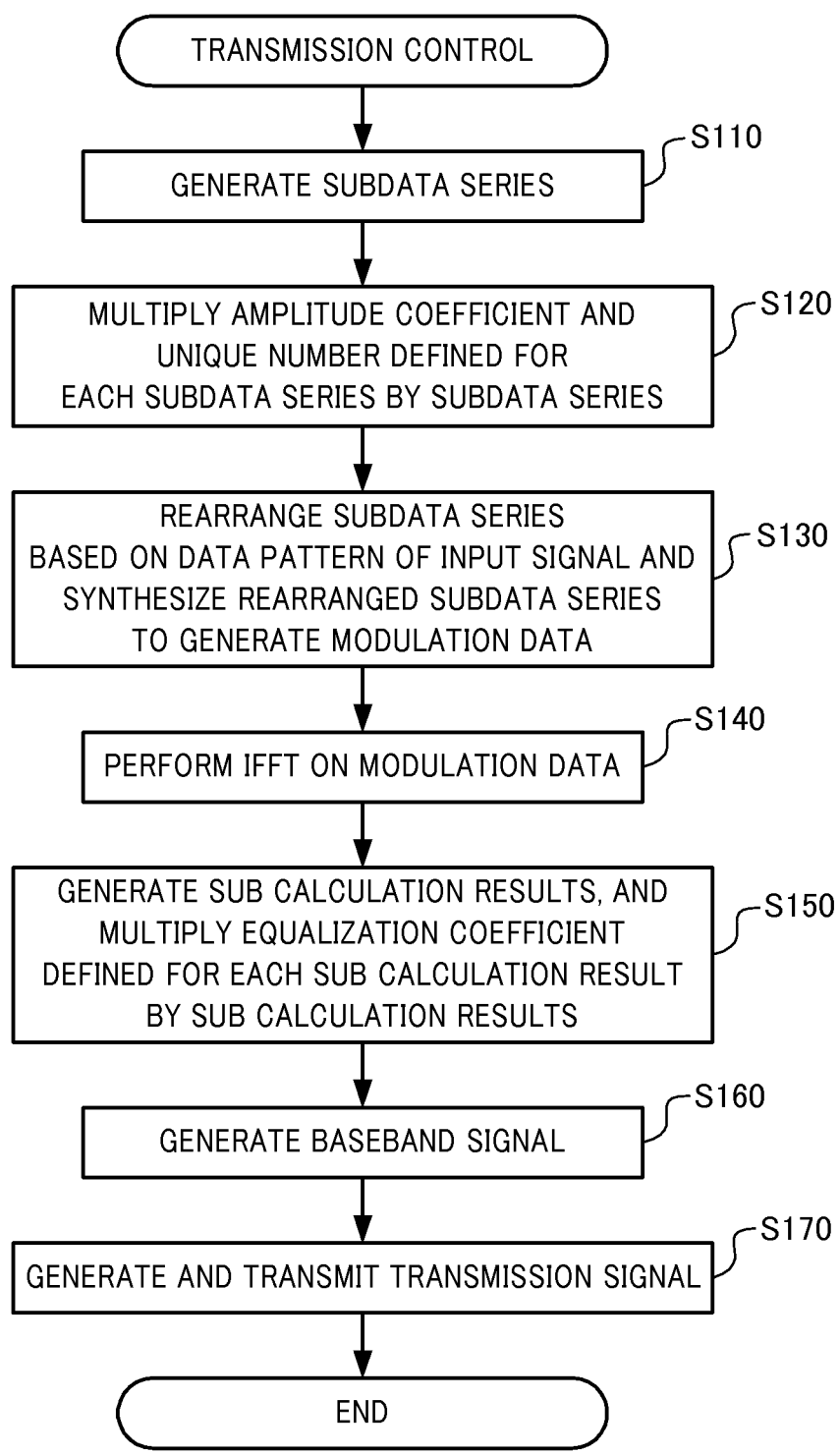

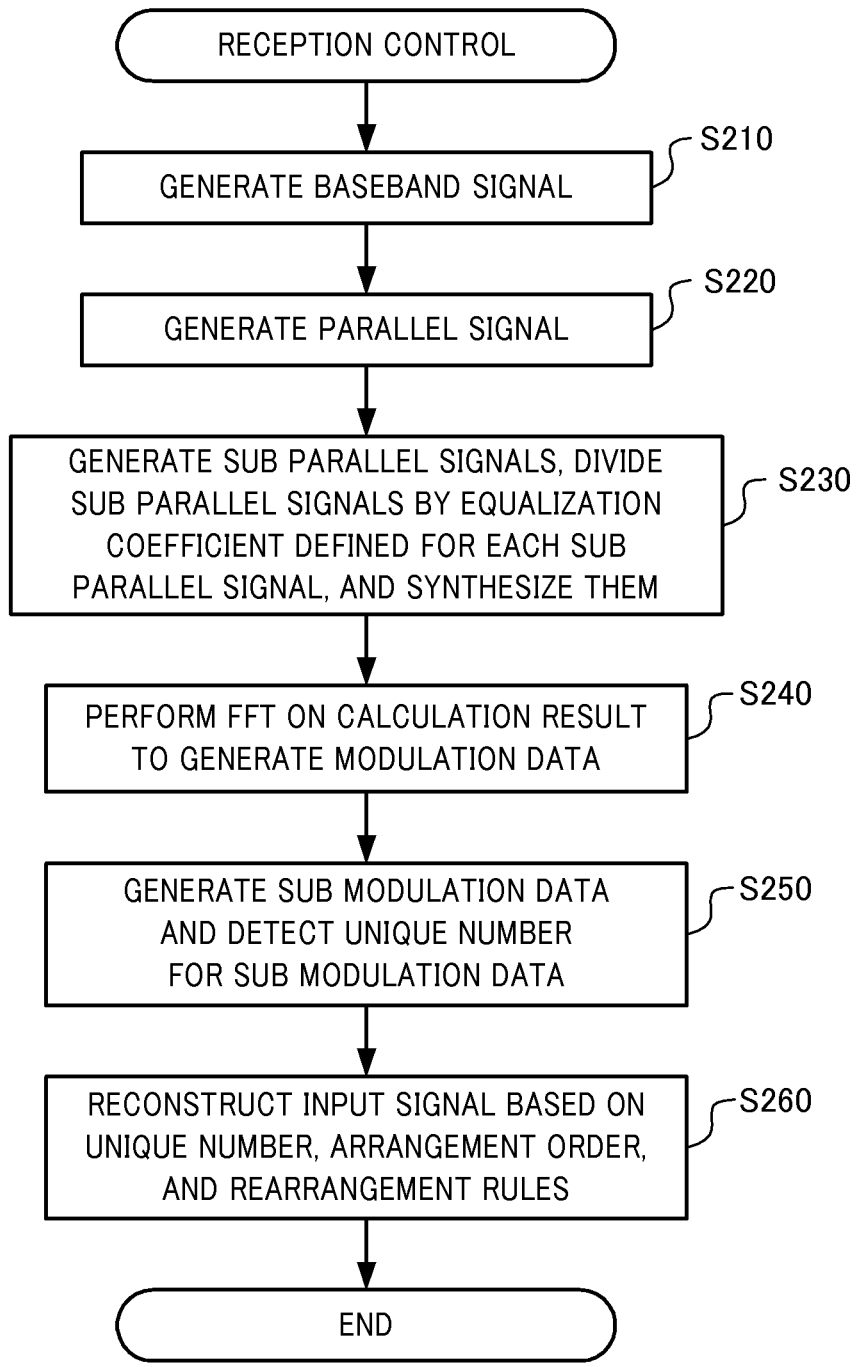

COMMUNICATION APPARATUS AND COMMUNICATION METHOD

CROSS-REFERENCE TO RELATED APPLICATION

This application claims the benefit of Japanese Patent Application No. 2012-067068, filed on Mar. 23, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in the PAPR.

SUMMARY

Accordingly, it is desirable to reduce the PAPR in OFDM communication, and control the degree of reduction in the PAPR.

According to a first aspect of the invention, there is provided a communication apparatus for communicating with another apparatus in orthogonal frequency-division multiplexing wireless communication, the communication apparatus comprising:

a modulator that generates a modulation signal by dividing a data series equally into a certain number a factorial of which is equal to or greater than a number of patterns expressed by data of an input signal to generate subdata series, the data series being a set of data which has an autocorrelation property such that an autocorrelation value with a data series whose data has not been shifted is higher than an autocorrelation value with a data series whose data has been shifted, performing a calculation which multiplies a predetermined amplitude coefficient and a unique number defined for each subdata series by each element of the subdata series, respectively, and rearranging the subdata series applied the calculation based on rearrangement rules which are associated with the patterns expressed by the data of the input signal one by one and synthesizing the rearranged subdata series;

a transformer that performs an inverse fast Fourier transformation on the modulation signal;

a calculator that divides a calculation result of the transformer equally into the certain number to generate sub calculation results, and multiplies an equalization coefficient defined for each sub calculation result by each element of the sub calculation results;

a synthesizer that generates a baseband signal by arranging the sub calculation results applied the calculation by the calculator, so that an arranged position corresponds to a position in the calculation result at a time of being divided equally by the calculator, and synthesizing the arranged result; and a transmitter that generates a transmission signal from the baseband signal to transmit.

It is preferable that the modulator may divide the data series equally into a minimum number among powers of two, a factorial of which is equal to or greater than the number of the patterns expressed by the data of the input signal to generate the subdata series.

It is preferable that the modulator may use a CAZAC (Constant Amplitude Zero Auto-Correlation) sequence as the data series.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

an inverse calculator that performs serial-parallel conversion on the baseband signal to generate a parallel signal, divides the parallel signal equally into a certain number to generate sub parallel signals, performs a calculation which divides each element of the sub parallel signals by an equalization coefficient defined for each sub parallel signal, arranges the sub parallel signals applied the calculation, so that an arranged position corresponds to a position in the parallel signal at a time of being divided equally, and synthesizing the arranged result;

a reception-side transformer that performs a fast Fourier transformation on a calculation result by the inverse calculator to generate modulation data; and a demodulator that divides the modulation data equally into the certain number to generate sub modulation data, detects a unique number defined for each sub modulation data in accordance with a predetermined criterion based on a value of each element of the sub modulation data, and reconstructs an input signal based on the unique number defined for each sub modulation data, an arrangement order of the sub modulation data in the modulation data at a time of being divided equally, and rearrangement rules which are associated with patterns expressed by data of the input signal one by one.

It is preferable that the demodulator, using ranges a number of which is same as a number of pieces of the sub modulation data, the ranges each representing a range of values, a number for uniquely specifying each range being assigned to the each range, may detect a range to which each element of each sub modulation data belongs, and may detect a number assigned to a range and for uniquely specifying the range to which a maximum number of elements belong among the each sub modulation data, as the unique number corresponding to the each sub modulation data.

According to a third aspect of the invention, there is provided a communication method that is executed by a communication apparatus communicating with another apparatus in orthogonal frequency-division multiplexing wireless communication, the communication method comprising:

a modulation step of generating a modulation signal by dividing a data series equally into a certain number a factorial of which is equal to or greater than a number of patterns expressed by data of an input signal to generate subdata series, the data series being an set of data which has an autocorrelation property such that an autocorrelation value with a data series whose data has not been shifted is higher than an autocorrelation value with a data series whose data has been shifted, performing a calculation which multiplies a predetermined amplitude coefficient and a unique number defined for each subdata series by each element of the subdata series, respectively, and rearranging the subdata series applied the calculation based on rearrangement rules which are associated with the patterns expressed by the data of the input signal one by one and synthesizing the rearranged subdata series;

a transformation step of performing an inverse fast Fourier transformation on the modulation signal;

a calculation step of dividing a calculation result of the transformation step equally into the certain number to generate sub calculation results, and multiplying an equalization coefficient defined for each sub calculation result by each element of the sub calculation results;

a synthesis step of generating a baseband signal by arranging the sub calculation results applied the calculation in the calculation step, so that an arranged position corresponds to a position in the calculation result at a time of being divided equally in the calculation step, and synthesizing the arranged result; and a transmission step of generating a transmission signal from the baseband signal to transmit.

It is preferable that in the modulation step, the subdata series may be generated by dividing the data series equally into a minimum number among powers of two, a factorial of which is equal to or greater than the number of the patterns expressed by the data of the input signal.

It is preferable that in the modulation step, a CAZAC (Constant Amplitude Zero Auto-Correlation) sequence may be used as the data series.

According to a fourth aspect of the invention, there is provided a communication method that is executed by a communication apparatus communicating with another apparatus in orthogonal frequency-division multiplexing wireless communication, the communication method comprising:

a reception step of receiving a transmission signal and generating a baseband signal;

an inverse calculation step of performing serial-parallel conversion on the baseband signal to generate a parallel signal, dividing the parallel signal equally into a certain number to generate sub parallel signals, performing a calculation which divides each element of the sub parallel signals by an equalization coefficient defined for the each sub parallel signal, arranging the sub parallel signals applied the calculation, so that an arranged position corresponds to a position in the parallel signal at a time of being divided equally, and synthesizing the arranged result;

a reception-side transformation step of performing a fast Fourier transformation on the calculation result in the inverse calculation step to generate modulation data; and a demodulation step of dividing the modulation data equally into the certain number to generate sub modulation data, detecting a unique number defined for each sub modulation data in accordance with a predetermined criterion based on a value of each element of the sub modulation data, and reconstructing an input signal based on the unique number defined for each sub modulation data, an arrangement order of the sub modulation data in the modulation data at a time of being divided equally, and rearrangement rules which are associated with patterns expressed by data of the input signal one by one.

It is preferable that in the demodulation step, using ranges a number of which is same as a number of pieces of the sub modulation data, the ranges each representing a range of values, a number for uniquely specifying each range being assigned to the each range, a range to which each element of each sub modulation data belongs may be detected, and a number assigned to a range and for uniquely specifying the range to which a maximum number of elements belong among the each sub modulation data may be detected, as the unique number corresponding to the each sub modulation data.

According to the invention, it is possible to reduce the PAPR in OFDM communication, and further control the degree of reduction in the PAPR.

BRIEF DESCRIPTION OF THE DRAWINGS

A more complete understanding of this application can be obtained when the following detailed description is considered in conjunction with the following drawings, in which:

FIG. 3 is a drawing illustrating rearrangement rules used for the communication apparatus according to the embodiment;

FIG. 10 is a flowchart illustrating an example of operation of a transmission control performed by the communication apparatus according to the embodiment;

FIG. 12 is a flowchart illustrating an example of operation of a reception control performed by the communication apparatus according to the embodiment.

DETAILED DESCRIPTION

Figure 1:
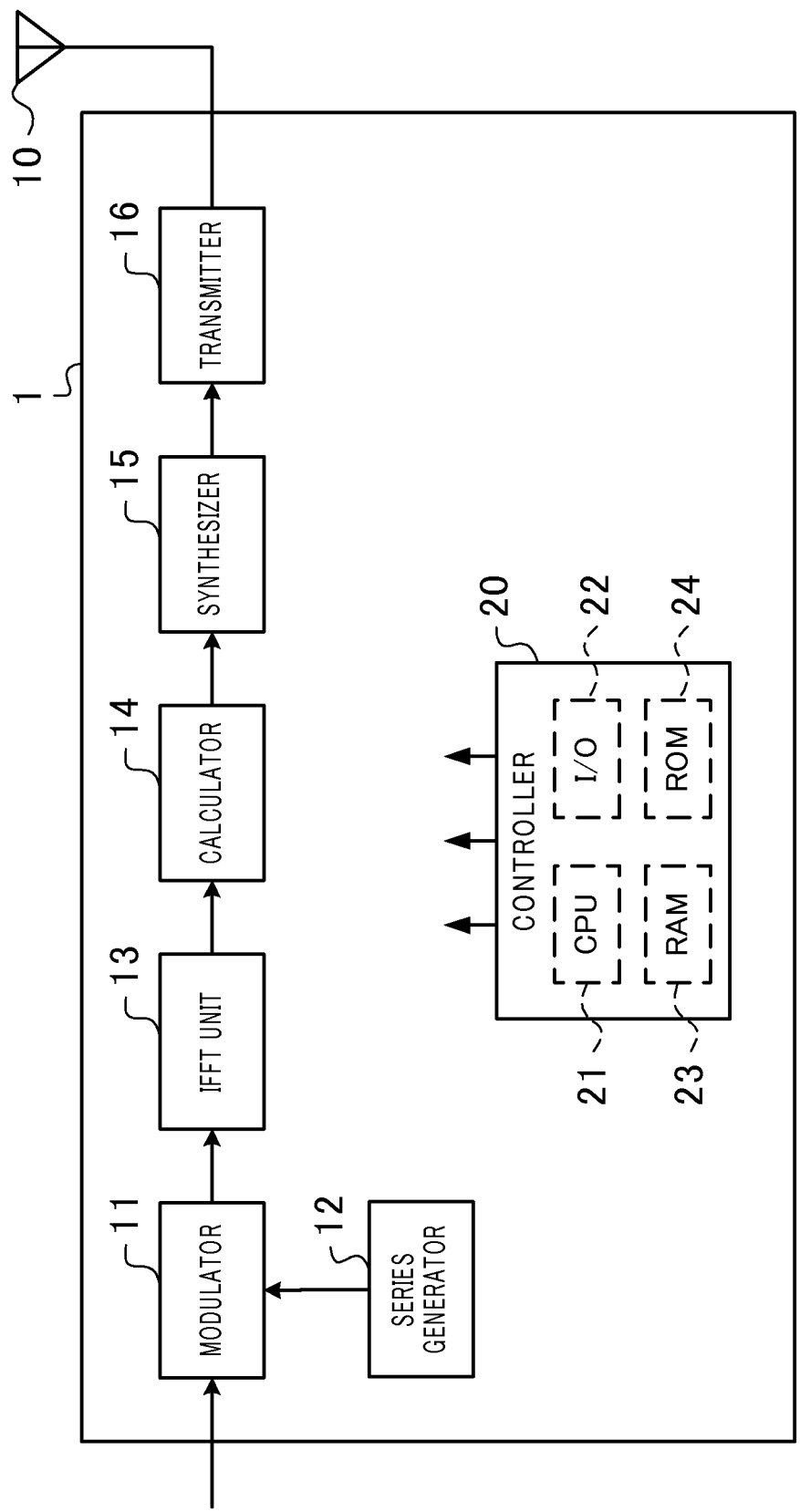
FIG. 1 is a block diagram illustrating a configuration example of a communication apparatus according to the exemplary embodiment of the invention.

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of DFT hereinafter.

FIG. 1 is a block diagram illustrating a configuration example of a communication apparatus according to the exemplary embodiment of the invention. The communication apparatus 1 communicates with another apparatus in OFDM (Orthogonal Frequency-Division Multiplexing) wireless communication. The communication apparatus 1 includes an antenna 10, a modulator 11, a series generator 12, an IFFT unit 13, a calculator 14, a synthesizer 15, a transmitter 16, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
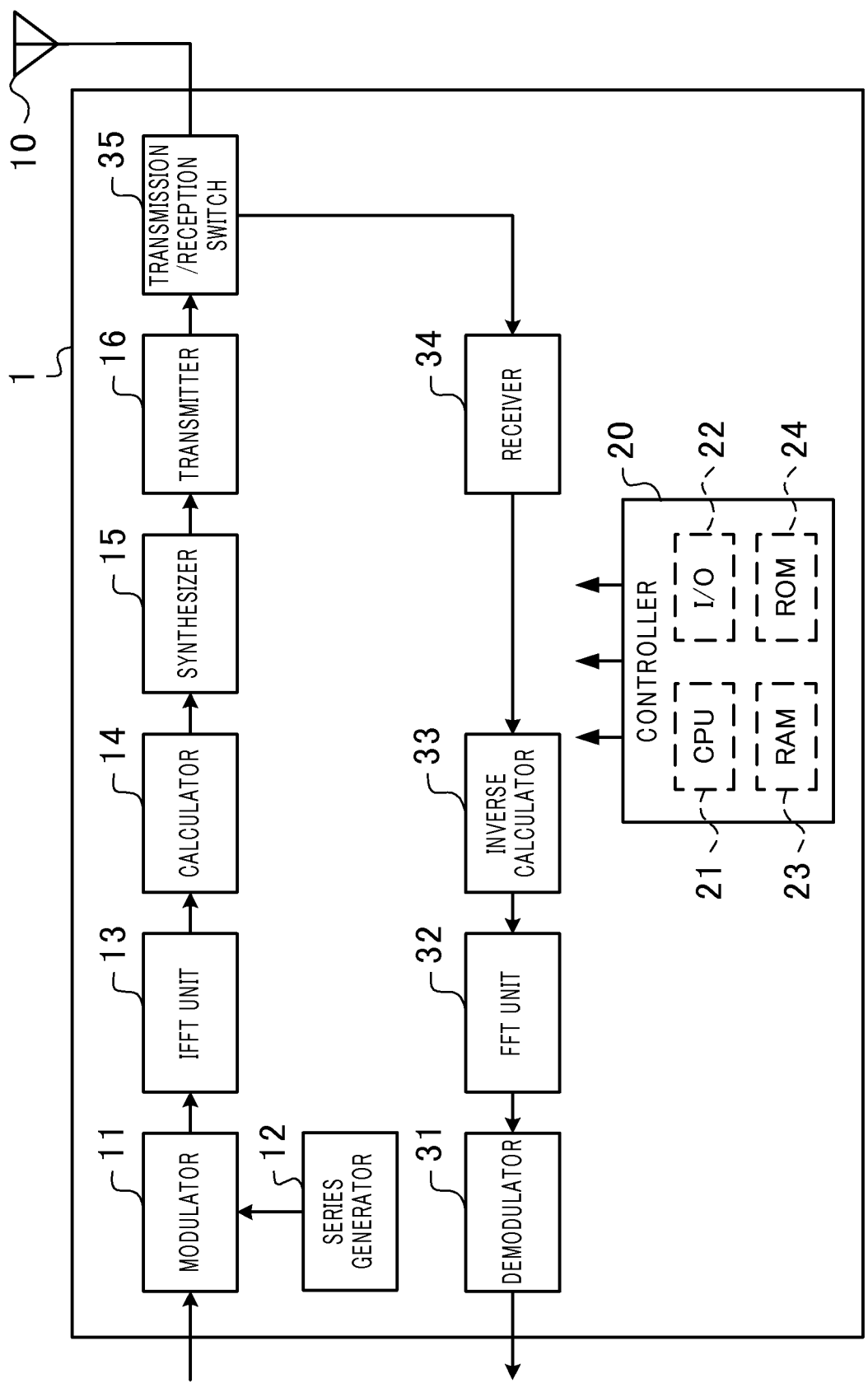
FIG. 2 is a block diagram illustrating a different configuration example of the communication apparatus according to the embodiment.

FIG. 2 is a block diagram illustrating a different configuration example of the communication apparatus according to the embodiment. To provide the communication apparatus 1 with a reception function, the communication apparatus 1 shown in FIG. 2 further includes a demodulator 31, an FFT unit 32, an inverse calculator 33, a receiver 34, and a transmission/reception switch 35. Referring to the communication apparatus 1 shown in FIG. 2 which has the transmission function and the reception function, a communication method which is carried out by the communication apparatus 1 will be described hereinbelow.

The series generator 12 divides an arbitrary data series, being a set of data which has an autocorrelation property, equally into a certain number a factorial of which is equal to or greater than the number of patterns expressed by data of an input signal to generate subdata series, and sends the generated subdata series to the modulator 11. The arbitrary data series having the autocorrelation property means a data series in which an autocorrelation value with a data series whose data has not been shifted is higher than an autocorrelation value with a data series whose data has been shifted. A value of at least one element in the data series, in which data is arbitrarily shifted, is different from the value of the element in the data series in which data is not shifted. As such a data series, a CAZAC (Constant Amplitude Zero Auto-Correlation) sequence can be used, for example. When the number of elements of the CAZAC sequence is expressed by N, the CAZAC sequence is represented by the following equation (1), and each element of the CAZAC sequence is represented by the following equation (2). The series generator 12 has stored information regarding the number of elements of the input signal beforehand.

[Eq. 1]
$$c = \begin{bmatrix} c_0 \\ c_1 \\ \vdots \\ c_{N-1} \end{bmatrix} \quad (1)$$

[Eq. 2]
$$c_{k-1} = \exp\left(\frac{i \cdot \pi \cdot k^2}{N}\right)(k = 1, 2, \ldots, N) \quad (2)$$

The series generator 12 divides the CAZAC sequence equally into the certain number M, a factorial of which is equal to or greater than the number of patterns expressed by the data of the input signal, as represented by the following equation (3), to generates the subdata series $b_0, b_1, \ldots, b_{M-1}$. For example, if the number of elements of the input signal is 4, the number of patterns in the data expressed by the input signal is 16 which is the fourth power of 2 because the value of each element of the input signal is 0 or 1. The factorial of 4 is 24, thus natural numbers equal to or greater than four can be used as the certain number. A minimum number among powers of two, a factorial of which is equal to or greater than the number of the patterns expressed by the data of the input signal, may be used as the certain number. Using the powers of two as the certain number allows a speed-up of the process by the IFFT unit 13, and using the minimum number among the powers of two as the certain number allows a suppression of an increase in the number of bits of transmission signal. Examples using the minimum number among the powers of two, a factorial of which is equal to or greater than the number of the patterns of data which may occur in the input signal are that, as is the case in which 4 is used as the certain number when the number of elements of the input signal is 4, 8 is used as the certain number when the number of elements of the input signal is 8, 16 is used as the certain number when the number of elements of the input signal is 16 or 32, and 32 is used as the certain number when the number of elements of the input signal is 64.

[Eq. 3]
$$c = \begin{bmatrix} b_0 \\ b_1 \\ \vdots \\ b_{M-1} \end{bmatrix} \quad (3)$$

The modulator 11 performs a calculation which multiplies a predetermined amplitude coefficient which is a predetermined real number, and a unique number defined for each subdata series by each element of the subdata series, respectively. The unique numbers defined for respective subdata series are continuous natural numbers which start from 1. For example, the unique numbers are defined in advance for respective subdata series, such that the unique number of the subdata series $b_0$ in the above-described equation (3) is 1, and the unique number of the subdata series $b_1$ is 2, and so on. With respect to the unique numbers, it is not necessarily to assign the continuous natural numbers which start from 1 to respective subdata series in an order of position in which respective subdata series are located in the data series. The unique numbers of respective subdata series which are included in a data series are only necessary to be the continuous natural numbers which start from 1. When setting M=4 in the above-mentioned equation (3), each element of each sub-data series is represented by the following equation (4).

[Eq. 4]

$$b_l = \begin{bmatrix} c_{\frac{N}{4}l} \\ c_{\frac{N}{4}l+1} \\ \vdots \\ c_{\frac{N}{4}(l+1)-1} \end{bmatrix} (l = 0, 1, 2, 3) \quad (4)$$

When the amplitude coefficient is expressed by a, and the unique numbers of the subdata series $b_0$, $b_1$, $b_2$ and $b_3$ are set to 1, 2, 3, and 4, respectively, the subdata series $b'_0$, $b'_1$, $b'_2$ and $b'_3$ which are applied in the above-described calculation are represented by the following equation (5), respectively.

[Eq. 5]

$$b'_0 = a \cdot b_0$$

$$b'_1 = 2a \cdot b_1$$

$$b'_2 = 3a \cdot b_2$$

$$b'_3 = 4a \cdot b_3 \quad (5)$$

The modulator 11 uses rearrangement rules which are associated with patterns expressed by the data of the input signal one by one. In cases where the number of the elements of the input signal is 4, the number of patterns expressed by the data is 16. The rearrangement rules for four data include 24 kinds of rules, 24 being a factorial of 4, if including a case where none of the positions of the data is changed. In this embodiment, 16 kinds of arbitrary rearrangement rules are associated with the patterns expressed by the data of the input signal one by one, among the 24 kinds of rearrangement rules. FIG. 3 is a drawing illustrating rearrangement rules used for the communication apparatus according to the embodiment. In cases where the number of the elements of the input signal is 4, the rearrangement rules of P1 to P16 are prepared. For example, the rearrangement rule P11 which is associated with the input signal 1010 represents switching positions of data so that data in a second position before rearrangement is moved to a first position, and similarly, data in a fourth position is moved to a second position, data in a first position is moved to a third position, and data in a third position is moved to a fourth position.

The modulator 11 generates the modulation data by rearranging the subdata series which already had the calculation applied based on rearrangement rules which are associated with data patterns of the input signal one by one and synthesizing the rearranged subdata series. Here, assuming that the input signal is 1010, the modulation data c', which has been applied the above-described calculation represented by the above-described equation (5) and in which the subdata series have been rearranged and synthesized, is represented by the following equation (6).

[Eq. 6]

$$c' = \begin{bmatrix} b'_1 \\ b'_3 \\ b'_0 \\ b'_2 \end{bmatrix} = \begin{bmatrix} 2a \cdot b_1 \\ 4a \cdot b_3 \\ a \cdot b_0 \\ 3a \cdot b_2 \end{bmatrix} \quad (6)$$

The modulator 11 sends the modulation data to the IFFT unit 13. The IFFT unit 13 performs an IFFT on the modulation data, and sends the calculation result to the calculator 14. The calculator 14 divides the calculation result of the IFFT unit 13 equally into the certain number to generate sub calculation results. The calculator 14 multiplies an equalization coefficient, which is the real number and defined for each sub calculation result, by each element of the sub calculation results. The certain number here is the same as the certain number used by the series generator 12. Suitable values for reducing PAPR (Peak-to-Average Power Ratio) are used for the equalization coefficients, as described below. The calculation result u by the IFFT unit 13 is represented by the following equation (7). In the equation, $F^{-1}$ is a matrix which represents an IFFT.

[Eq. 7]

$$u = F^{-1} \cdot c' \quad (7)$$

In cases where the modulation data is represented by the above-described equation (6), the calculator 14 divides the calculation result u equally into four to generate the sub calculation results $u_0$, $u_1$, $u_2$ and $u_3$, as represented by the following equation (8).

[Eq. 8]

$$u = \begin{bmatrix} u_0 \\ u_1 \\ u_2 \\ u_3 \end{bmatrix} \quad (8)$$

The calculator 14 multiplies the equalization coefficients which are the real numbers defined for respective sub calculation results, by respective elements of the sub calculation results. When the equalization coefficients defined for respective sub calculation results are expressed by $f_0$, $f_1$, $f_2$, and $f_3$, the sub calculation results $u'_0$, $u'_1$, $u'_2$ and $u'_3$, which have already had the above-described calculation applied, are represented by the following equation (9).

[Eq. 9]

$$u'_0 = f_0 \cdot u_0$$

$$u'_1 = f_1 \cdot u_1$$

$$u'_2 = f_2 \cdot u_2$$

$$u'_3 = f_3 \cdot u_3 \quad (9)$$

The calculator 14 sends the sub calculation result derived from the above-described calculation to the synthesizer 15. The synthesizer 15 generates a baseband signal by arranging the sub calculation results derived from the calculation represented by the above-described equation (9) by the calculator 14, so that an arranged position corresponds to a position in the calculation result u at the time of being divided equally, as represented by the following equation (10), and synthesizing the arranged results. The synthesizer 15 sends the baseband signal to the transmitter 16.

[Eq. 10]

$$u' = \begin{bmatrix} u'_0 \\ u'_1 \\ u'_2 \\ u'_3 \end{bmatrix} \quad (10)$$

The transmitter 16 generates the transmission signal from the baseband signal, and transmits the transmission signal to another apparatus via the transmission/reception switch 35 and the antenna 10.

Figure 4:
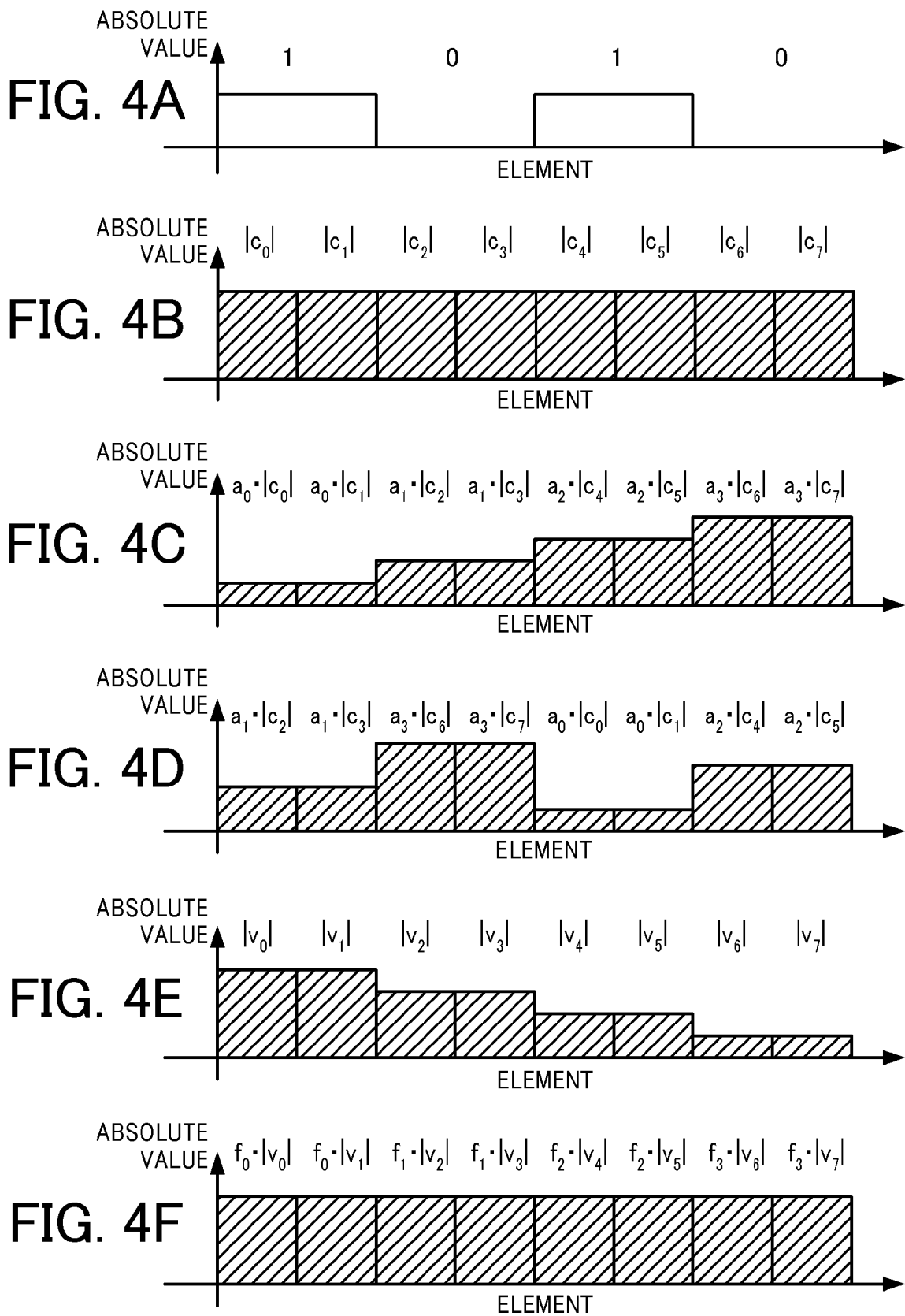
FIGS. 4A to 4F are drawings illustrating a modulation process performed by the communication apparatus according to the embodiment.

FIGS. 4A to 4F are drawings illustrating a modulation process performed by the communication apparatus according to the embodiment. The abscissa represents the element and the ordinate represents the absolute value of the element. Since each element of the CAZAC sequence is a complex number, the illustration is simplified using the absolute value of each element. Here, it is assumed that the number of the elements of the input signal is 4, and the number of the elements of the CAZAC sequence is 8. FIG. 4A illustrates the input signal, and FIG. 4B illustrates the CAZAC sequence. FIG. 4C illustrates a result of generating the subdata series by dividing the CAZAC sequence equally into four by the series generator 12, and multiplying the unique number defined for each subdata series and the amplitude coefficient by the subdata series by the modulator 11 as represented by the above-described equation (5). In the drawing, $a_0=a$, $a_1=2a$, $a_2=3a$, and $a_3=4a$, respectively. FIG. 4D illustrates the modulation data, in which the subdata series applied the calculation as illustrated in FIG. 4C is rearranged and synthesized based on the rearrangement rule associated with the input signal 1010. FIG. 4E illustrates the result of performing an IFFT on the modulation data. The $v_0$ through $v_7$ represent the values of respective elements of the result of performing an IFFT on the modulation data. FIG. 4F illustrates the result of dividing the result of performing an IFFT on the modulation data illustrated in FIG. 4E equally into four, and multiplying equalization coefficients by the divided results, as represented by the above-described equation (9). The baseband signal is generated based on the data illustrated in FIG. 4F.

Figure 5:
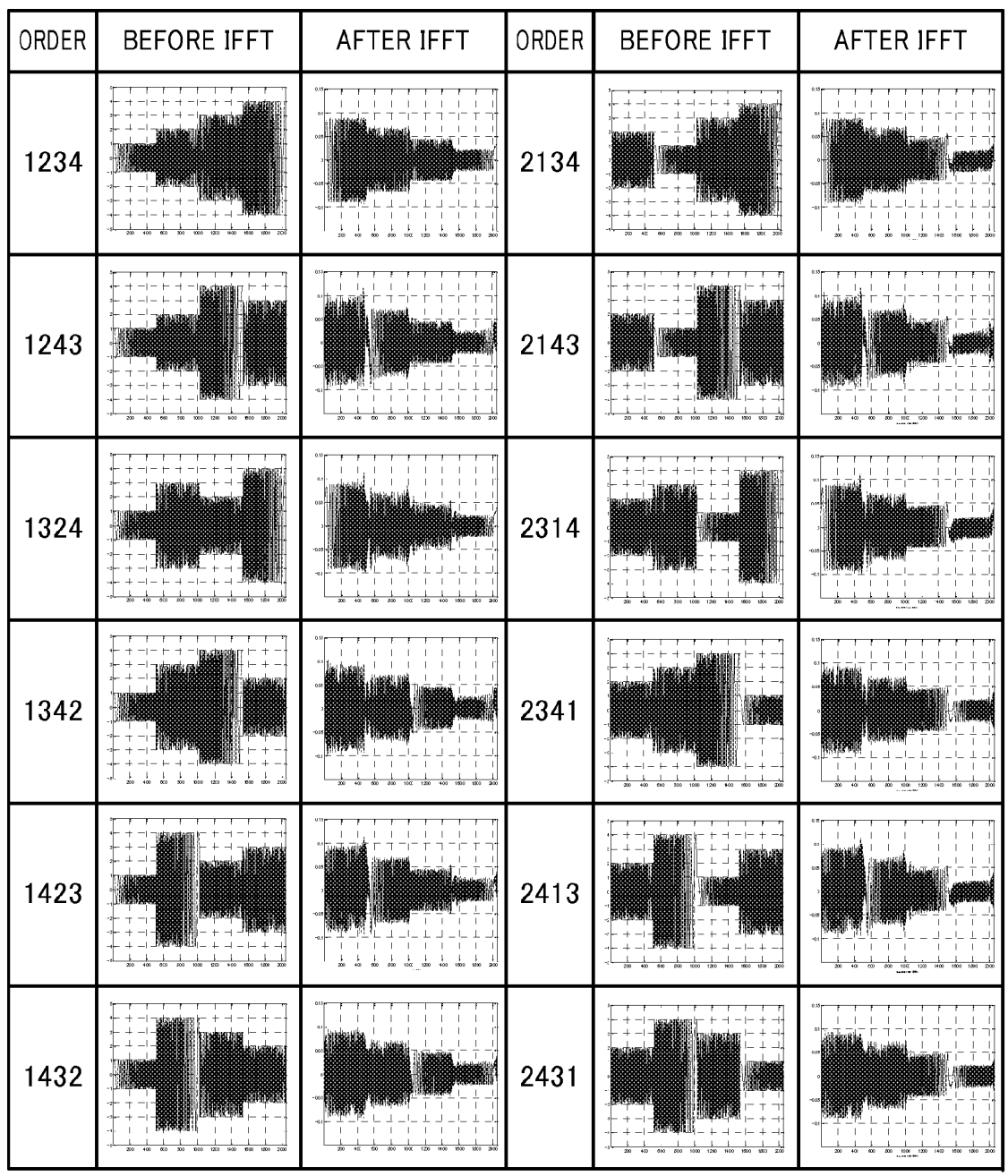
FIG. 5 is a drawing illustrating changes of amplitude due to a process by the IFFT unit according to the embodiment.
Figure 6:
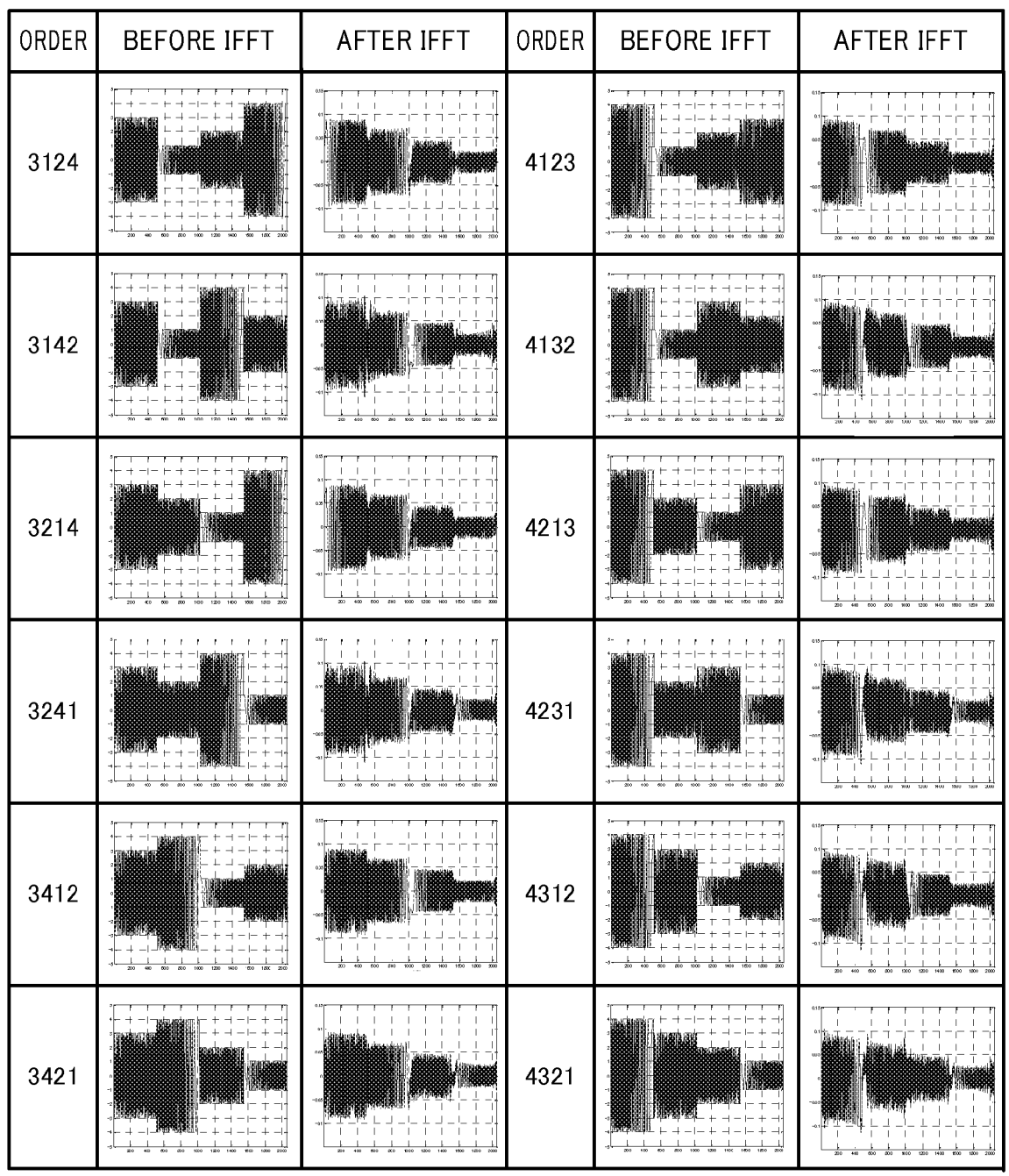
FIG. 6 is a drawing illustrating changes of amplitude due to a process by the IFFT unit according to the embodiment.

FIG. 5 and FIG. 6 are drawings illustrating changes of amplitude due to a process by the IFFT unit according to the embodiment. Assuming that the number of elements of the input signal was 4, the number of elements of the CAZAC sequence and the FFT size was 2048 respectively, and the number of subdata series was 4, a simulation was performed for processes by components starting from the modulator 11 through to the IFFT unit 13, with respect to each pattern expressed by the data of the input signal. The "order" described in the drawing means an order of the subdata series after rearranging the subdata series which have had the calculation applied by the modulator 11. In the field of "before IFFT," the abscissa represents the element and the ordinate represents the value of the real part of each element of the modulation data. In the field of "after IFFT," the abscissa represents the element and the ordinate represents the value of the real part of each element as of the result of performing an IFFT on the modulation data. As illustrated in the drawings, it can be found that envelope curves illustrated by respective elements of the result of performing an IFFT on the modulation data substantially match each other, regardless the order of the subdata series after rearrangement. Accordingly, the PAPR can be reduced by multiplying the equalization coefficients, defined for respective sub calculation result which is generated by dividing the calculation result equally, by each element of the sub calculation results so that an envelope curve is made into like a straight line, as illustrated in FIG. 4F. As to the imaginary part, the similar result is obtained for the envelope curve illustrated for each element of the result of having performed an IFFT on the modulation data.

Figure 7:
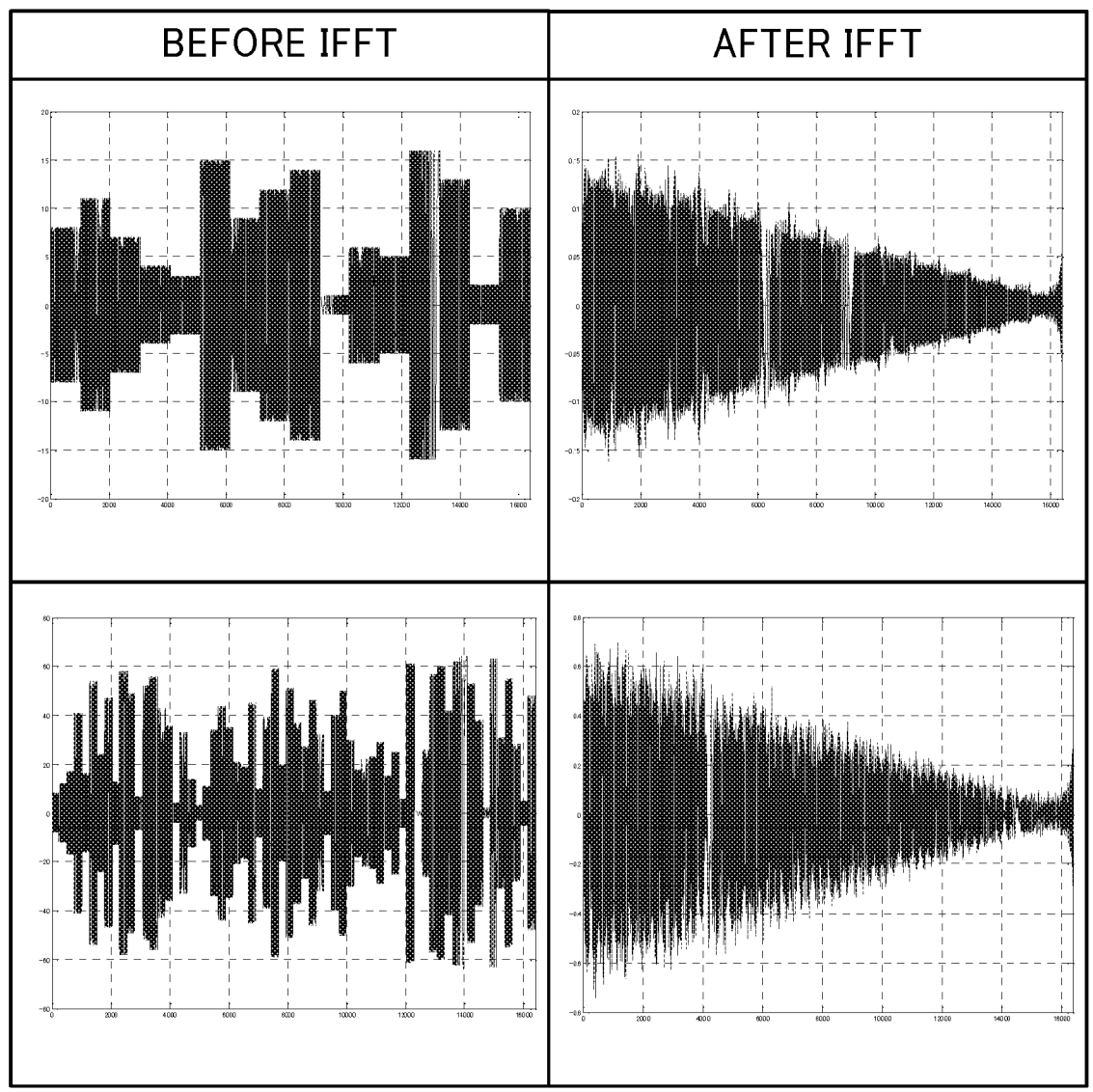
FIG. 7 is a drawing illustrating changes of amplitude due to a process by the IFFT unit in a case of changing the number of subdata series according to the embodiment.

FIG. 7 is a drawing illustrating changes of amplitude due to a process by the IFFT unit in a case of changing the number of subdata series according to the embodiment. The upper field illustrates a simulation result for processes by components starting from the modulator 11 through to the IFFT unit 13, under a condition in which the number of the elements of the input signal is 32, the number of the elements of the CAZAC sequence and the FFT size are 16384 respectively, and the number of subdata series is 16. The natural number a factorial of which is equal to or more than the 32nd power of 2 is 13, thus 16 which is a power of 2 and the minimum among the natural numbers equal to 13 or more was used as the number of the subdata series in the simulation. The lower field illustrates a simulation result for processes by components from the modulator 11 through to the IFFT unit 13, under a condition in which the number of the elements of the input signal is 256, the number of the elements of the CAZAC sequence and the FFT size are 16384 respectively, and the number of subdata series is 64. The natural number a factorial of which is equal to or more than the 256th power of 2 is 58, thus 64 which is power of 2 and the minimum among the natural numbers equal to 58 or more was used as the number of the subdata series in the simulation. In the field of "before IFFT," the abscissa represents element and the ordinate represents the value of the real part of each element of the modulation data. In the field of "after IFFT," the abscissa represents the element and the ordinate represents the value of the real part of each element of the result of performing an IFFT on the modulation data. As illustrated in the drawing, envelope curves illustrated by respective elements of a result in the upper field and elements of a result in the lower field to which an IFFT is performed substantially match each other, and it can be found that a form of the envelope curve illustrated by respective elements of the result of performing an IFFT on the modulation data depend on the FFT size.

Figure 8:
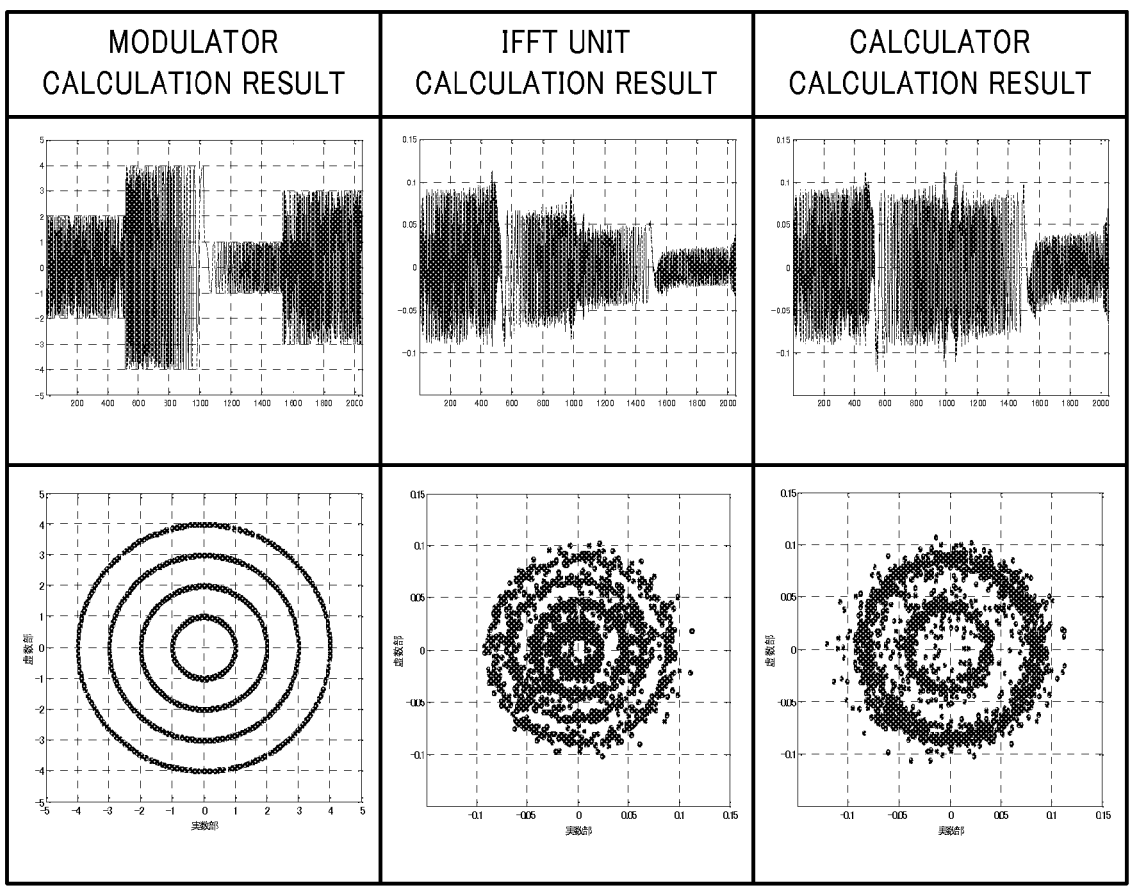
FIG. 8 is a drawing illustrating changes of amplitude and signal point arrangements due to a process by the calculator according to the embodiment.

FIG. 8 is a drawing illustrating changes of amplitude and signal point arrangements due to a process by the calculator according to the embodiment. With respect to the input signal 1010, a simulation was performed for processes by components from the modulator 11 to the calculator 14. In an upper side of a field for a modulator calculation result, the abscissa represents the element and the ordinate represents the value of the real part of each element of modulation data. In a lower side of the field for the modulator calculation result, a signal point arrangement of the modulation data is illustrated. In an upper side of a field for an IFFT unit calculation result, the abscissa represents the element and the ordinate represents the value of the real part of each element of modulation data performed an IFFT by the IFFT unit 13. In a lower side of the field for the IFFT unit calculation result, a signal point arrangement of the modulation data applied IFFT by the IFFT unit 13 is illustrated. In an upper side of a field for calculator calculation results, it is illustrated values of the real parts of respective elements of a sub calculation result applied the calculation by the calculator 14. In a lower side of the field for the calculator calculation result, it is illustrated the signal point arrangement of the sub calculation results applied the calculation by the calculator 14. In the calculator 14, the calculation process was performed, in which the equalization coefficients in the above-described equation (9) were set to $f_0=1$, $f_1=1.3$, $f_2=1.8$, and $f_3=1.8$ respectively.

The PAPR of the signal which is generated from the result of performing an IFFT on modulation data by the IFFT unit 13 is 5.5306 dB, whereas the PAPR of the signal which is generated by synthesizing the sub calculation results applied the calculation by the calculator 14 is 4.0022 dB. Therefore, it can be found that the PAPR can be reduced by applying a multiplication of the equalization coefficients by the calculator 14.

Figure 9:
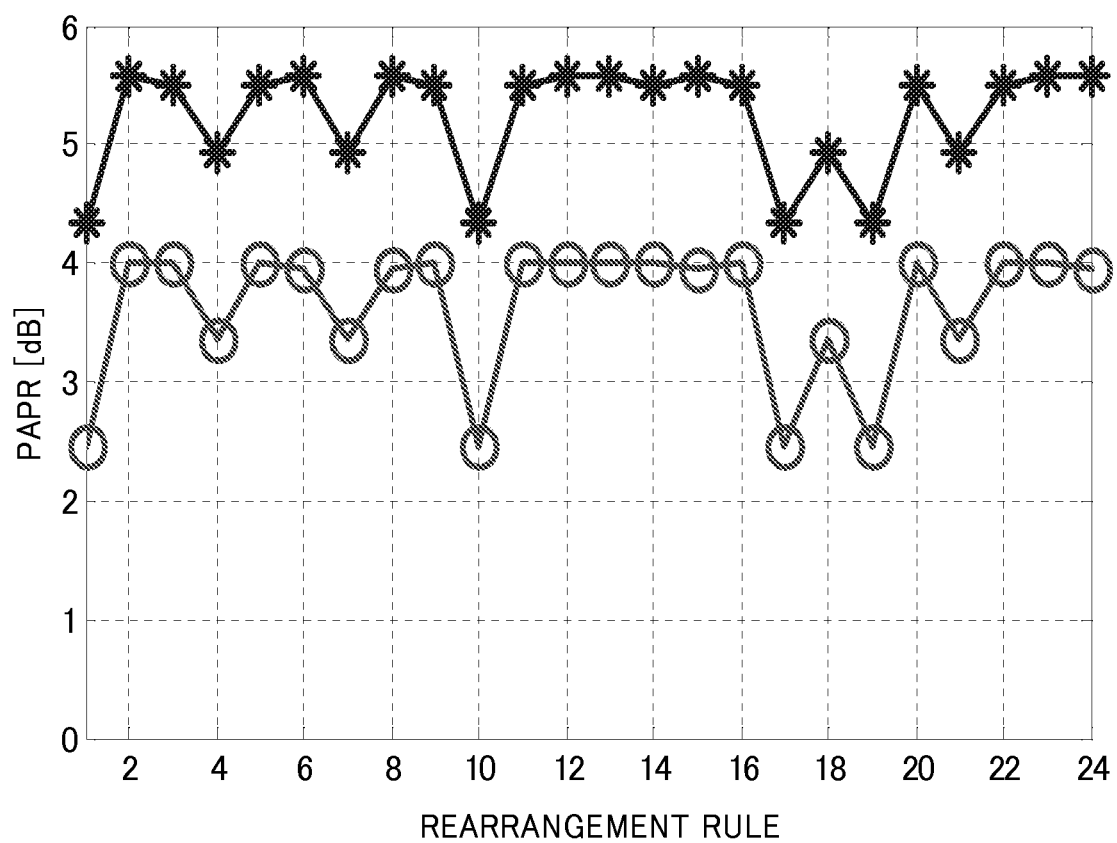
FIG. 9 is a drawing illustrating changes of the PAPR due to a process by the calculator according to the embodiment.

FIG. 9 is a drawing illustrating changes of the PAPR due to a process by the calculator according to the embodiment. The abscissa represents a rearrangement rule and the ordinate represents the PAPR (unit: dB). Assuming that the number of elements of the input signal was 4, the number of elements of the CAZAC sequence and the FFT size was 2048 respectively, and the number of subdata series was 4, a simulation was performed for processes by components from the modulator 11 through to the calculator 14, with respect to 24 kinds of rearrangement rules, 24 being a factorial of 4. A graph on which the plotting points are represented with asterisks illustrates the PAPR of the signal generated from the result of performing an IFFT on the modulation data by the IFFT unit 13, and a graph on which the plotting points are represented with circles illustrates the PAPR of the signal generated by synthesizing the sub calculation results applied the calculation by the calculator 14. As illustrated in the drawing, even in the case where any of the rearrangement rules is applied, it can be found that the PAPR can be reduced by about 1.5 dB by applying a multiplication of the equalization coefficients by the calculator 14.

FIG. 10 is a flowchart illustrating an example of operation of a transmission control performed by the communication apparatus according to the embodiment. The series generator 12 divides the arbitrary data series having the autocorrelation property equally into the certain number to generate the subdata series (step S110). The modulator 11 multiplies the predetermined amplitude coefficient and the unique number defined for each subdata series, by each element of the subdata series, respectively (step S120). The modulator 11 rearranges the subdata series applied the above-described calculation based on the rearrangement rules which are associated with patterns expressed by the data of the input signal one by one, and synthesizing the rearranged subdata series to generate the modulation data (step S130).

The IFFT unit 13 performs an IFFT on the modulation data (step S140). The calculator 14 divides the calculation result by the IFFT unit 13 equally into the certain number to generate the sub calculation results, and multiplies the equalization coefficient defined for each sub calculation result by each element of the sub calculation results (step S150). The synthesizer 15 generates the baseband signal by arranging the sub calculation results that have already had the calculation applied by the calculator 14, so that an arranged position corresponds to a position in the calculation result at the time of being divided equally, and synthesizing the arranged result (step S160). The transmitter 16 generates the transmission signal from the baseband signal, and transmits the transmission signal to another apparatus via the transmission/reception switch 35 and the antenna 10 (step S170). After completion of the transmission process in the step S170, the processes are finished.

As described above, the PAPR can be reduced by applying the above-described calculation on the transmission side. Hereinafter, the process on a reception side will be described.

The receiver 34 receives the transmission signal via the antenna 10 and the transmission/reception switch 35, generates the baseband signal, and sends the baseband signal to the inverse calculator 33.

The inverse calculator 33 performs serial-parallel conversion on the baseband signal to generate the parallel signal. The parallel signal r matches data u', which is represented by the above-described equation (10) and which is synthesized by the synthesizer 15 on the transmission side. The inverse calculator 33 divides the parallel signal equally into the certain number to generate sub parallel signals. The certain number is the same as the certain number used by the series generator 12 on the transmission side, and the sub parallel signals $r_0$, $r_1$, $r_2$, and $r_3$ match data $u'_0$, $u'_1$, $u'_2$, and $u'_3$, respectively. The inverse calculator 33 divides each element of the sub parallel signals by the equalization coefficient which is the real number defined for each sub parallel signal. The equalization coefficients are the same as those used by the calculator 14 on the transmission side. It is premised that the information regarding the certain number and the equalization coefficients have been held on the reception side beforehand. The sub parallel signals $r'_0$, $r'_1$, $r'_2$, and $r'_3$ applied the above-described calculation are represented by the following equation (11), and match the sub calculation results $u_0$, $u_1$, $u_2$, and $u_3$ obtained by dividing the calculation result u of the IFFT unit 13 equally into four by the calculator 14 on the transmission side, respectively.

[Eq. 11]

$$r'_0 = \frac{1}{f_0} u'_0 = u_0 \qquad (11)$$
$$r'_1 = \frac{1}{f_1} u'_1 = u_1$$
$$r'_2 = \frac{1}{f_2} u'_2 = u_2$$
$$r'_3 = \frac{1}{f_3} u'_3 = u_3$$

The inverse calculator 33 arranges the sub parallel signals that have already had above-described calculation applied, so that arranged positions corresponds to positions of the sub parallel signals, which are applied the above-described calculation, at the time of being divided equally, synthesizes the arranged result, and sends the synthesized data to the FFT unit 32. The data arranged so that arranged positions corresponds to positions of the sub parallel signals at the time of being divided equally and synthesized matches the calculation result u by the IFFT unit 13 on the transmission side. The FFT unit 32 generates the modulation data by performing an FFT on the calculation result by the inverse calculator 33, and sends the generated modulation data to the demodulator 31. The modulation data matches the modulation data generated by the modulator 11 on the transmission side.

The demodulator 31 divides the modulation data equally into the certain number to generate sub modulation data. The sub modulation data $s_0$, $s_1$, $s_2$, and $s_3$, which is generated by dividing the modulation data equally into the certain number, are represented by the following equation (12). The certain number is the same as the certain number used by the inverse calculator 33, and the same as the certain number used by the series generator 12. Therefore, the sub modulation data $s_0$, $s_1$, $s_2$, and $s_3$ match data $b'_1$, $b'_3$, $b'_0$, and $b'_2$ in the above-described equation (6), respectively.

[Eq. 12]

$$s = \begin{bmatrix} s_0 \\ s_1 \\ s_2 \\ s_3 \end{bmatrix} \quad (12)$$

The demodulator 31 detects the unique number defined for each sub modulation data in accordance with a predetermined criterion based on a value of each element of the sub modulation data. For example, the demodulator 31 assigns to each range a number for uniquely specifying the each range, using ranges each of which represents a range of values, the number of used ranges being the same number of pieces of the sub modulation data. Alternatively, the demodulator 31 may use ranges to which numbers for uniquely specifying respective ranges are assigned in advance, the number of ranges being the same number of pieces of the sub modulation data. The demodulator 31, with respect to each sub modulation data, detects a range to which each element of the sub modulation data belongs within such ranges and detects a number assigned to a range and for uniquely specifying the range to which a maximum number of elements belong among the sub modulation data, as the unique number corresponding to the sub modulation data. In cases where the number of the elements included in each sub modulation data is one, the demodulator 31 can detect a number for uniquely specifying the range, assigned to the range to which the one element belongs, as the unique number corresponding to the sub modulation data. The unique number defined for each sub modulation data match the unique number defined for each subdata series that has already had the calculation applied by the modulator 11 corresponding to the sub modulation data.

The demodulator 31 reconstructs the input signal based on the unique number defined for the each sub modulation data, an arrangement order of the sub modulation data in the modulation data at a time of being divided equally, and the predetermined rearrangement rules which are associated with patterns expressed by the data of the input signal one by one. The rearrangement rules are same as the rearrangement rules used by the modulator 11 on the transmission side illustrated in FIG. 3, and the information regarding the rearrangement rules have been held on the reception side beforehand.

For example, it is assumed that a range in which the absolute value of the element is equal to or more than 0 and less than 1.5 a is set to a range 1, a range in which the absolute value of the element is equal to or more than 1.5 a and less than 2.5 a is set to a range 2, a range in which the absolute value of the element is equal to or more than 2.5 a and less than 3.5 a is set to a range 3, and a range in which the absolute value of the element is equal to or more than 3.5 a is set to a range 4. Moreover, it is assumed that the number for uniquely specifying the range assigned to the ranges 1, 2, 3 and 4 is set to 1, 2, 3, and 4, respectively. Here, "a" is the amplitude coefficient used by the modulator 11 on the transmission side, and the information regarding the amplitude coefficient has been held on the reception side beforehand. From the above-described equations (5) and (6), the ranges corresponding to the sub modulation data $s_0$, $s_1$, $s_2$, and $s_3$ are the range 2, the range 4, the range 1, and the range 3, respectively, and it can be detected that the unique numbers are 2, 4, 1, and 3. Since the input signal is 1010 in the case where data after rearrangement is 2413 according to the rearrangement rules illustrated in FIG. 3, the input signal 1010 can be reconstructed on the reception side.

Figure 11A:
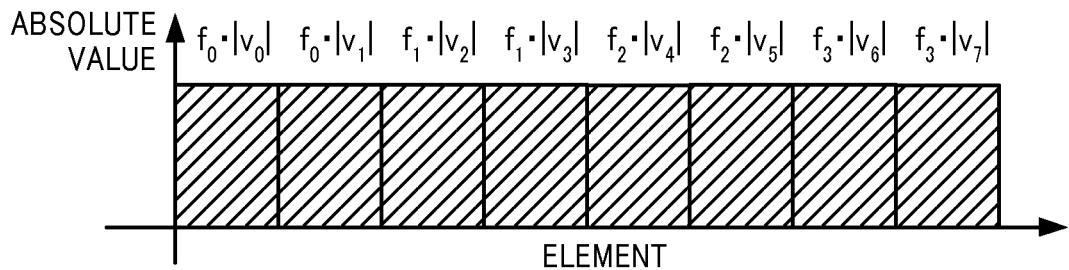
FIGS. 11A to 11D are drawings illustrating a demodulation process performed by the communication apparatus according to the embodiment.
Figure 11B:
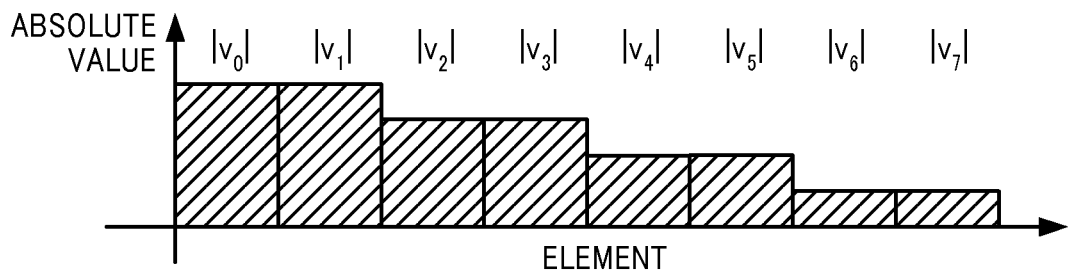
Figure 11C:
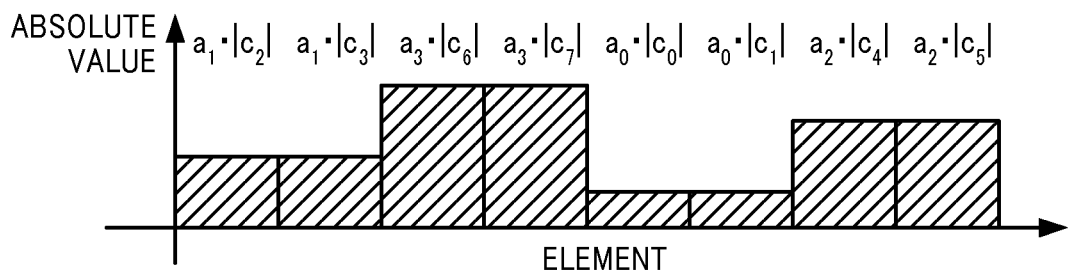
Figure 11D:
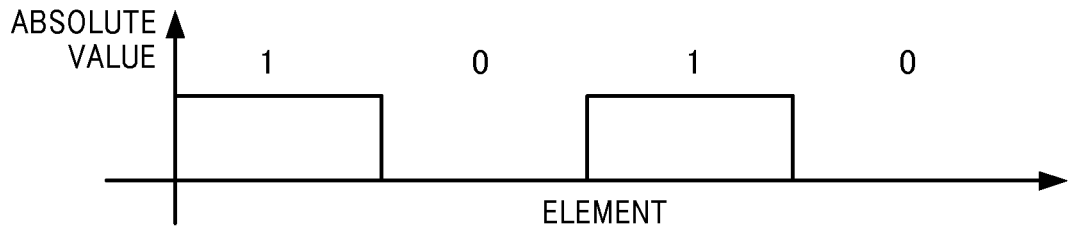

FIGS. 11A to 11D are drawings illustrating a demodulation process performed by the communication apparatus according to the embodiment. The abscissa represents the element and the ordinate represents the absolute value of the element. Since each element of the CAZAC sequence is a complex number, the illustration is simplified using the absolute value of each element. FIG. 11A illustrates the parallel signal. FIG. 11B illustrates the result of dividing each element of the sub parallel signals, which have been generated by dividing the parallel signal, by the equalization coefficient defined for each sub parallel signal, as represented by the above-described equation (11). FIG. 11C illustrates the modulation data which is generated by performing an FFT on the data in which the sub parallel signals applied the calculation illustrated in FIG. 11B have been synthesized. FIG. 11D illustrates the input signal reconstructed based on the unique number defined for the each sub modulation data which have been generated by dividing the modulation data, the arrangement order of the sub modulation data when being divided equally, and the rearrangement rules which are associated with patterns expressed by the data of the input signal one by one.

FIG. 12 is a flowchart illustrating an example of operation of a reception control performed by the communication apparatus according to the embodiment. The receiver 34 receives the transmission signal via the antenna 10 and the transmission/reception switch 35, and generates the baseband signal (step S210). The inverse calculator 33 performs serial-parallel conversion on the baseband signal to generate the parallel signal (step S220). The inverse calculator 33 divides the parallel signal equally into the certain number to generate the sub parallel signals, divides each element of the sub parallel signals by the equalization coefficient defined for the each sub parallel signal, and arranges the result, so that arranged positions corresponds to positions of the sub parallel signals at the time of being divided equally, and synthesizes the arranged result (step S230).

The FFT unit 32 performs an FFT on the calculation result of the inverse calculator 33 to generate the modulation data (step S240). The demodulator 31 divides the modulation data equally into the certain number to generate sub modulation data, and detects the unique number defined for the each sub modulation data in accordance with the predetermined criterion based on the value of each element of the sub modulation data (step S250). The demodulator 31 reconstructs the input signal based on the unique number defined for the each sub modulation data, the arrangement order of the sub modulation data when being divided equally, and rearrangement rules which are associated with patterns expressed by the data of the input signal one by one (step S260). After completion of the reconstruction process of the input signal in the step S170, the processes are finished.

As described above, according to the communication apparatus 1 according to the embodiment of the invention, it is possible to reduce the PAPR in OFDM communication, by applying a predetermined calculation to the data series based on the input signal to generate the baseband signal. As will be discussed later, the communication apparatus 1 can reduce the PAPR and control the degree of reduction in the PAPR.

SPECIFIC EXAMPLES

Next, the advantages of the embodiment of the invention will be described based on the results of simulation. The simulation was performed on generation of the baseband signal using a random signal as the input signal, and repetitive calculation of the PAPR according to the related art and the embodiment of the invention. The CCDF (Complementary Cumulative Distribution Function) of the PAPR, i.e., the characteristic of the probability of occurrence of the PAPR, according to the related art was compared with the CCDF of the PAPR according to the embodiment of the invention. For the related art, the modulation signal obtained by modulating the input signal with QPSK (Quadrature Phase-Shift Keying) modulation was performed the serial-parallel conversion, and the subcarrier modulation signal was generated by assigning the signal to subcarriers with frequency components orthogonal to each other. Then, the subcarrier modulation signal was performed an IFFT and synthesized to generate the baseband signal. It was assumed that the number of elements of the input signal was 256, and the FFT size was 128.

Figure 13:
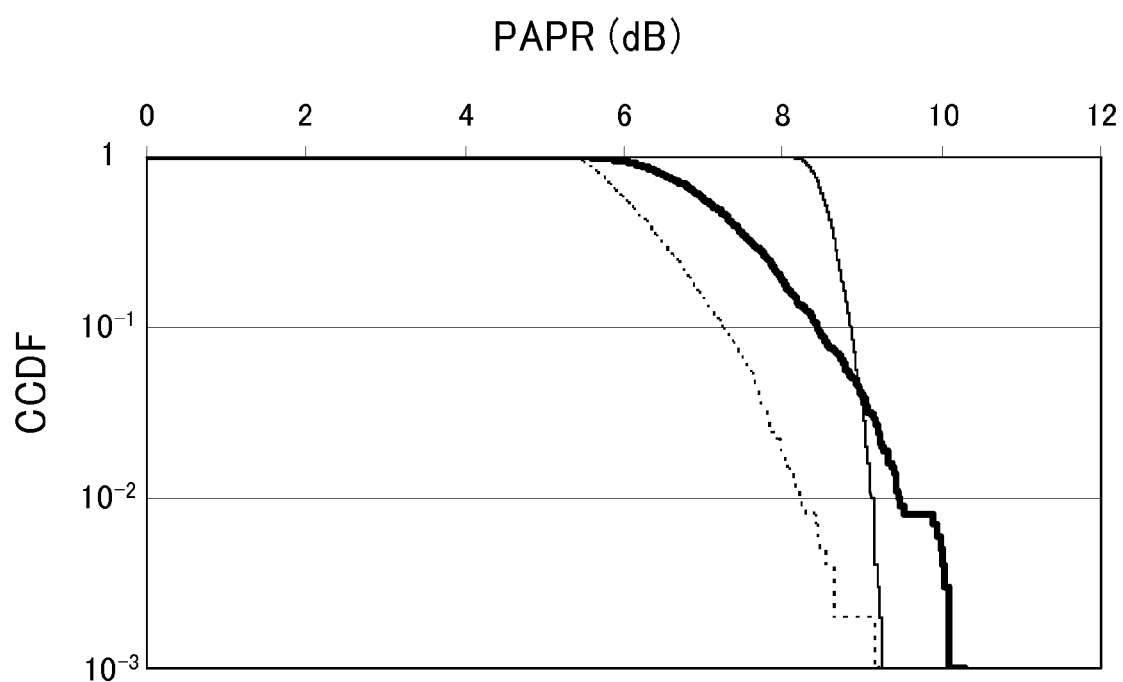
FIG. 13 is a diagram illustrating simulated CCDF characteristics of the PAPR of the baseband signal.

FIG. 13 is a diagram illustrating simulated CCDF characteristics of the PAPR of the baseband signal. The abscissa represents the PAPR (unit: dB), and the ordinate represents the CCDF of the PAPR. For the present embodiment, assuming that the number of elements of the input signal was 256, the FFT size was 16384, and the number of subdata series was 64, a simulation was performed using the CAZAC sequence each element of which was represented by the above-described equation (3). Moreover, for the present embodiment, a simulation was performed, with respect to a case without applying the calculation in which the equalization coefficient was multiplied by the calculator 14, and a case with applying the calculation, respectively.

A thick solid-line graph represents the CCDF characteristic of the PAPR according to the related art. A thin solid-line graph represents the CCDF characteristic of the PAPR according to the embodiment in a case without applying the calculation in which the equalization coefficient was multiplied by the calculator 14. A dotted-line graph represents the CCDF characteristic of the PAPR according to the embodiment in a case with applying the calculation by the calculator 14. It can be found that the PAPR is reduced by applying the calculation by the calculator 14. Furthermore, since the case without applying the calculation by the calculator 14 corresponds to a case where all equalization coefficients are set to 1, it can be found that the degree of reduction of the PAPR can be controlled by changing the equalization coefficients. For example, the PAPR can be reduced by performing a simulation using an arbitrary random signal, detecting suitable equalization coefficients, and using the suitable equalization coefficients by the calculator 14.

According to the above-described simulation, it has been found that the present embodiment can reduce the PAPR by applying a predetermined calculation to the data series based on the input signal, and generating the baseband signal. Moreover, it has been found that the degree of reduction of the PAPR can be controlled by changing the equalization coefficients.

The modes of the invention are not limited to the foregoing embodiments. It may be configured so that the process in the series generator 12 may be processed by the modulator 11. The IFFT unit 13 may be configured so as to perform an IDFT instead of an IFFT. The FFT unit 32 may be configured so as to perform a DFT instead of an FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
    a modulator that generates a modulation signal by dividing a data series equally into a certain number a factorial of which is equal to or greater than a number of patterns expressed by data of an input signal to generate subdata series, the data series being a set of data which has an autocorrelation property such that an autocorrelation value with a data series whose data has not been shifted is higher than an autocorrelation value with a data series whose data has been shifted, performing a calculation which multiplies a predetermined amplitude coefficient and a unique number defined for each subdata series by each element of the subdata series, respectively, and rearranging the subdata series applied the calculation based on rearrangement rules which are associated with the patterns expressed by the data of the input signal one by one and synthesizing the rearranged subdata series;
    a transformer that performs an inverse fast Fourier transformation on the modulation signal;
    a calculator that divides a calculation result of the transformer equally into the certain number to generate sub calculation results, and multiplies an equalization coefficient defined for each sub calculation result by each element of the sub calculation results;
    a synthesizer that generates a baseband signal by arranging the sub calculation results applied the calculation by the calculator, so that an arranged position corresponds to a position in the calculation result at a time of being divided equally by the calculator, and synthesizing the arranged result; and
    a transmitter that generates a transmission signal from the baseband signal to transmit.

2. The communication apparatus according to claim 1, wherein,
    the modulator divides the data series equally into a minimum number among powers of two, a factorial of which is equal to or greater than the number of the patterns expressed by the data of the input signal to generate the subdata series.

3. The communication apparatus according to claim 1, wherein the modulator uses a CAZAC (Constant Amplitude Zero Auto-Correlation) sequence as the data series.

4. A communication apparatus for communicating with another apparatus in orthogonal frequency-division multiplexing wireless communication, the communication apparatus comprising:
    a receiver that receives a transmission signal and generates a baseband signal;
    an inverse calculator that performs serial-parallel conversion on the baseband signal to generate a parallel signal, divides the parallel signal equally into a certain number to generate sub parallel signals, performs a calculation which divides each element of the sub parallel signals by an equalization coefficient defined for each sub parallel signal, arranges the sub parallel signals applied the calculation, so that an arranged position corresponds to a position in the parallel signal at a time of being divided equally, and synthesizing the arranged result;
    a reception-side transformer that performs a fast Fourier transformation on a calculation result by the inverse calculator to generate modulation data; and
    a demodulator that divides the modulation data equally into the certain number to generate sub modulation data, detects a unique number defined for each sub modulation data in accordance with a predetermined criterion based on a value of each element of the sub modulation data, and reconstructs an input signal based on the unique number defined for each sub modulation data, an arrangement order of the sub modulation data in the modulation data at a time of being divided equally, and rearrangement rules which are associated with patterns expressed by data of the input signal one by one.

5. The communication apparatus according to claim 4, wherein,
the demodulator, using ranges a number of which is same as a number of pieces of the sub modulation data, the ranges each representing a range of values, a number for uniquely specifying each range being assigned to the each range, detects a range to which each element of each sub modulation data belongs, and detects a number assigned to a range and for uniquely specifying the range to which a maximum number of elements belong among the each sub modulation data, as the unique number corresponding to the each sub modulation data.

6. A communication method that is executed by a communication apparatus communicating with another apparatus in orthogonal frequency-division multiplexing wireless communication, the communication method comprising:
a modulation step of generating a modulation signal by dividing a data series equally into a certain number a factorial of which is equal to or greater than a number of patterns expressed by data of an input signal to generate subdata series, the data series being an set of data which has an autocorrelation property such that an autocorrelation value with a data series whose data has not been shifted is higher than an autocorrelation value with a data series whose data has been shifted, performing a calculation which multiplies a predetermined amplitude coefficient and a unique number defined for each subdata series by each element of the subdata series, respectively, and rearranging the subdata series applied the calculation based on rearrangement rules which are associated with the patterns expressed by the data of the input signal one by one and synthesizing the rearranged subdata series;
a transformation step of performing an inverse fast Fourier transformation on the modulation signal;
a calculation step of dividing a calculation result of the transformation step equally into the certain number to generate sub calculation results, and multiplying an equalization coefficient defined for each sub calculation result by each element of the sub calculation results;
a synthesis step of generating a baseband signal by arranging the sub calculation results applied the calculation in the calculation step, so that an arranged position corresponds to a position in the calculation result at a time of being divided equally in the calculation step, and synthesizing the arranged result; and
a transmission step of generating a transmission signal from the baseband signal to transmit.

7. The communication method according to claim 6, wherein,
in the modulation step, the subdata series are generated by dividing the data series equally into a minimum number among powers of two, a factorial of which is equal to or greater than the number of the patterns expressed by the data of the input signal.

8. The communication method according to claim 6, wherein, in the modulation step, a CAZAC (Constant Amplitude Zero Auto-Correlation) sequence is used as the data series.

9. A communication method that is executed by a communication apparatus communicating with another apparatus in orthogonal frequency-division multiplexing wireless communication, the communication method comprising:
a reception step of receiving a transmission signal and generating a baseband signal;
an inverse calculation step of performing serial-parallel conversion on the baseband signal to generate a parallel signal, dividing the parallel signal equally into a certain number to generate sub parallel signals, performing a calculation which divides each element of the sub parallel signals by an equalization coefficient defined for the each sub parallel signal, arranging the sub parallel signals applied the calculation, so that an arranged position corresponds to a position in the parallel signal at a time of being divided equally, and synthesizing the arranged result;
a reception-side transformation step of performing a fast Fourier transformation on the calculation result in the inverse calculation step to generate modulation data; and
a demodulation step of dividing the modulation data equally into the certain number to generate sub modulation data, detecting a unique number defined for each sub modulation data in accordance with a predetermined criterion based on a value of each element of the sub modulation data, and reconstructing an input signal based on the unique number defined for each sub modulation data, an arrangement order of the sub modulation data in the modulation data at a time of being divided equally, and rearrangement rules which are associated with patterns expressed by data of the input signal one by one.

10. The communication method according to claim 9, wherein,
in the demodulation step, using ranges a number of which is same as a number of pieces of the sub modulation data, the ranges each representing a range of values, a number for uniquely specifying each range being assigned to the each range, a range to which each element of each sub modulation data belongs is detected, and a number assigned to a range and for uniquely specifying the range to which a maximum number of elements belong among the each sub modulation data is detected, as the unique number corresponding to the each sub modulation data.

* * * * *